June 3, 1930.  E. H. SIMONSEN  1,761,847
MACHINE TOOL
Filed Sept. 6, 1928  3 Sheets-Sheet 1
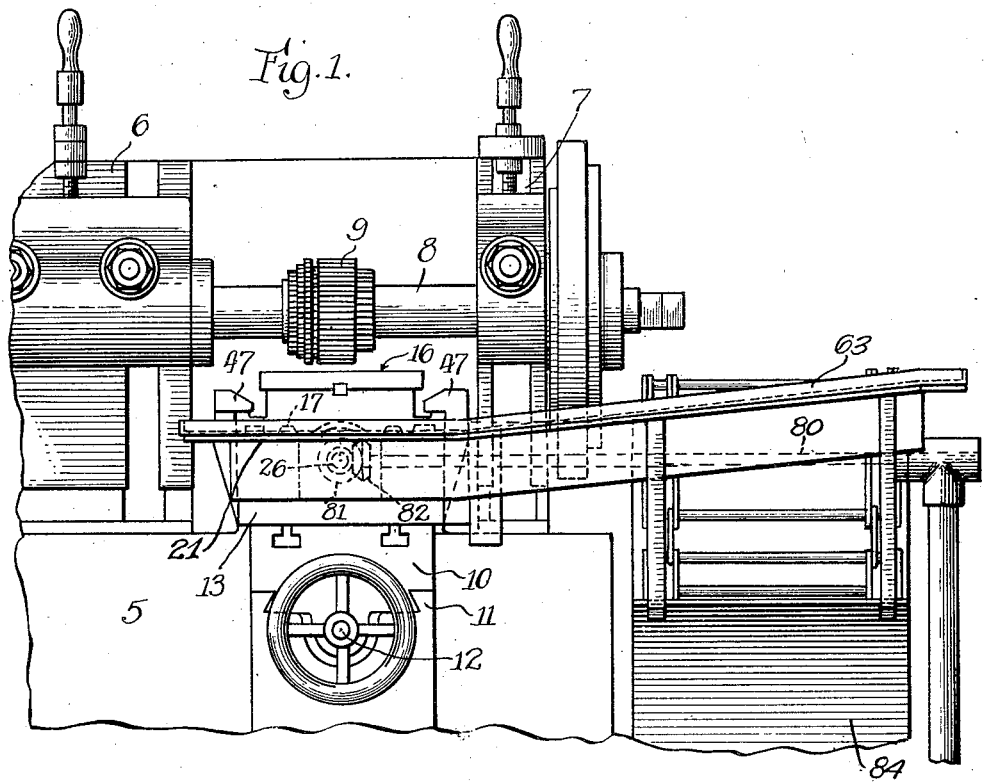
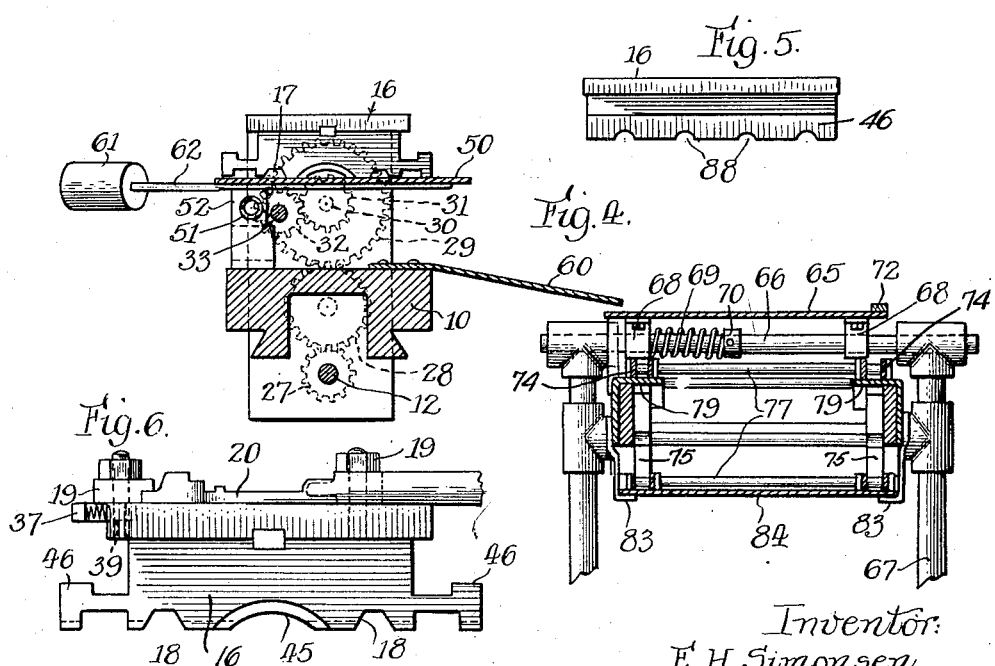
Inventor:
E. H. Simonsen

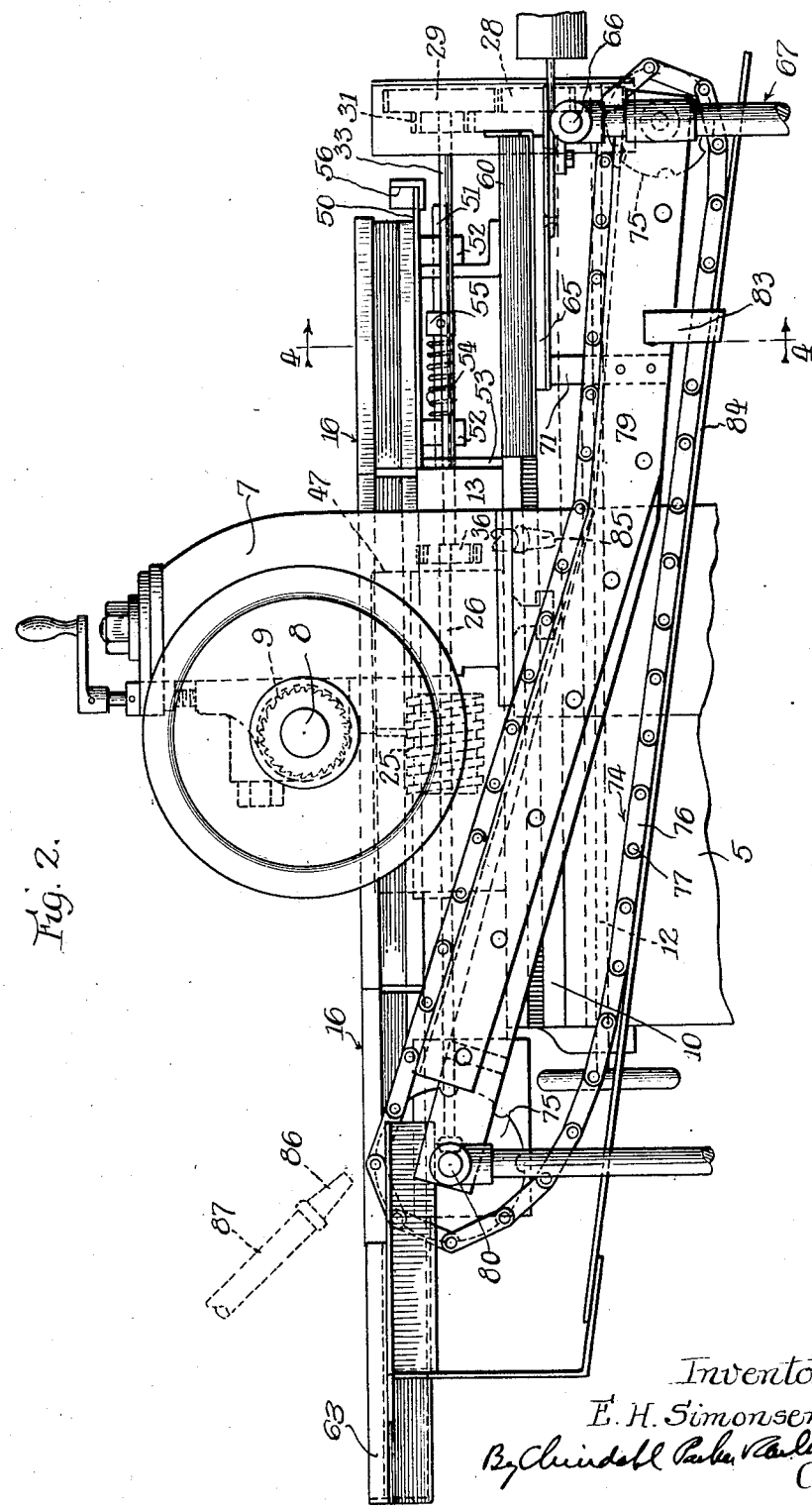

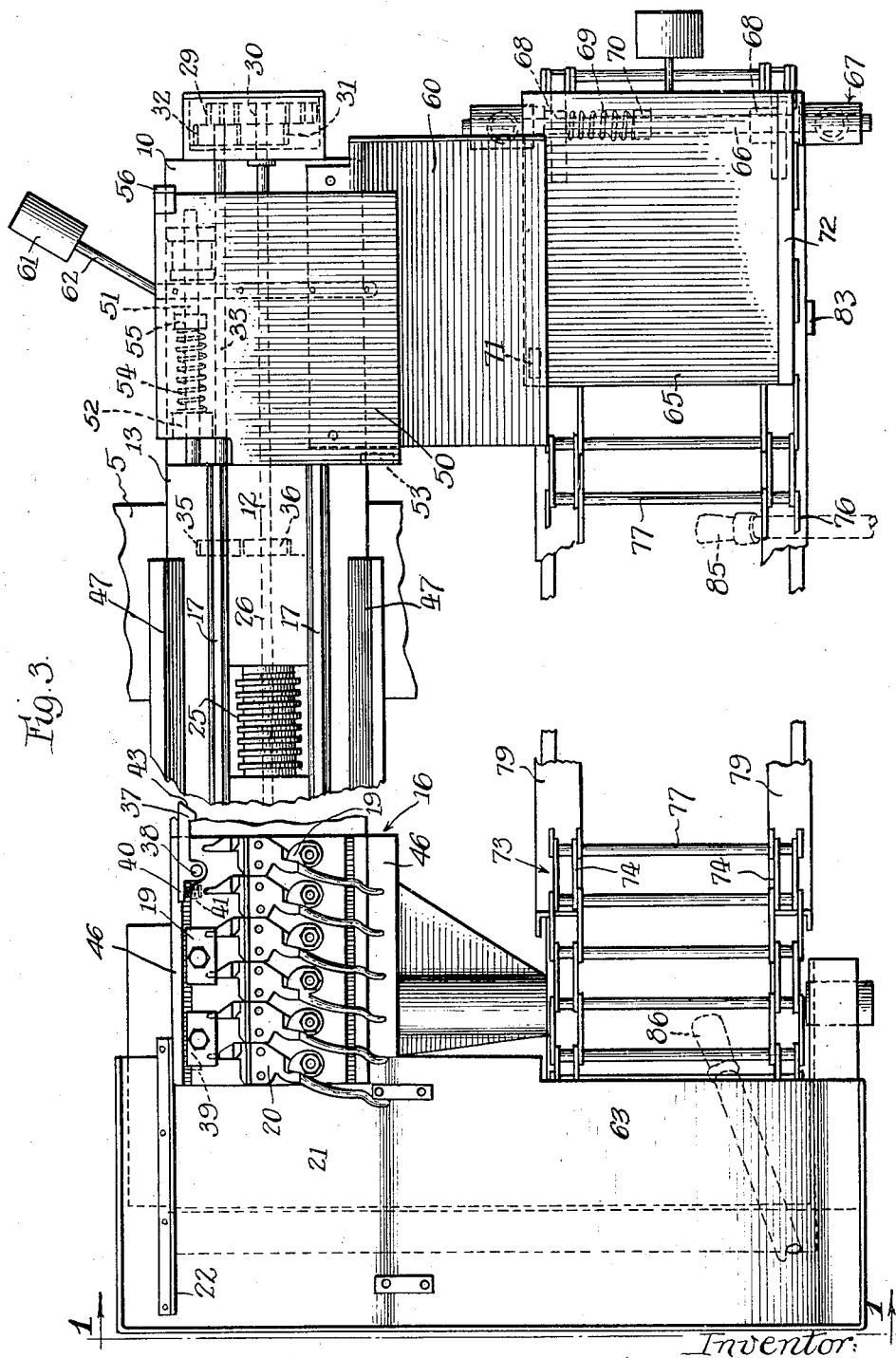

Patented June 3, 1930

1,761,847

UNITED STATES PATENT OFFICE

EDWARD H. SIMONSEN, OF CHICAGO, ILLINOIS, ASSIGNOR TO R. M. EDDY FOUNDRY COMPANY, OF CHICAGO, ILLINOIS, A CORPORATION OF ILLINOIS

MACHINE TOOL

Application filed September 6, 1928. Serial No. 304,252.

The invention relates generally to machine tools and more particularly to milling machines of the type wherein work pieces are continuously fed in one direction past the cutter.

The primary object of the present invention is to provide such a milling machine having a plurality of tables or work holders adapted to be fed along a guideway past the cutter in interlocked abutting end to end relation and embodying automatic means for unlatching the finished work holder and removing it from the path of the following one and for returning the holders to a position adjacent the feeding-in end of the machine whereby to simplify the operation of the machine and to reduce the cost of the work produced thereby.

A more specific object of the invention is to provide a machine of this character embodying novel automatic means for returning the work holders to the loading table in unreversed position so as to facilitate the removal and replacement of the work pieces.

Another object is to provide such a machine having automatic means for moving the leading work holder out of the path of the following work tables so as to obviate the necessity of having a special attendant at that end of the machine during its continuous operation.

Another object is to provide an improved transfer device for automatically changing the direction of travel of a moving work holder or the like, which device is of a simple character and positive in its operation.

Another object is to provide in a machine tool having ways leading past a processing tool and a plurality of work holders movable along the ways, means for latching the holders together at the feeding-in end of the ways together with means for automatically unlatching the work holders after they have passed the processing tool.

Another object is to provide a milling machine of this general type having automatic means for returning the work holders to the loading position arranged to facilitate the removal of chips from the holders by application of pressure fluid thereto.

A more specific object is to provide, in a machine tool having a plurality of work holders moving in one direction, novel means operable by a work holder for changing the direction of travel of the work holder.

Other objects and advantages will become apparent from the following description taken in connection with the accompanying drawings in which:

Figure 1 is a fragmentary front elevational view of a milling machine embodying the preferred form of the invention. The view is taken from a position indicated by the dotted line 1—1 in Fig. 3.

Fig. 2 is a fragmentary side elevational view of the machine shown in Fig. 1 as viewed from the right in Fig. 1.

Fig. 3 is a fragmentary plan view of the machine shown in Figs. 1 and 2.

Fig. 4 is a sectional view taken along the line 4—4 in Fig. 2 looking in the direction of the arrows.

Fig. 5 is a side elevational view of one of the work holders.

Fig. 6 is an enlarged end elevational view of one of the work holders with a work piece clamped in position thereon.

While I have shown in the accompanying drawings and will herein describe in detail the preferred embodiment of the invention together with one alternative embodiment thereof, it is to be understood that this disclosure is given for the purpose of illustrating the invention and is not intended as a limitation of the invention to the construction disclosed. In the appended claims, I aim to cover all modifications and alternative constructions falling within the scope of the invention as limited by the state of the prior art.

In the form chosen for disclosure herein, I have shown the invention as applied to a standard milling machine having a base 5 with a column or headstock 6 and a tailstock 7 positioned at the opposite ends thereof. A rotatable tool arbor 8 is carried between suitable spindles in the headstock 6 and the tailstock 7 and carries a milling cutter 9 mounted thereon. As mentioned above, the machine illustrated herein is of the type which has a table 10 slidable on ways 11 formed on the base 5 beneath and transversely of the cutter 9. A feed screw 12 is provided which normally serves to reciprocate the table 10 beneath the cutter but in the present instance means other than the table 10 is provided for moving the work past the cutter in one direction.

To this end the table 10 in the exemplary form illustrated herein is disconnected from the feed screw 12 and an auxiliary base 13 is mounted thereover in fixed position relatively to the cutter 9. This base is arranged to support a plurality of relatively small individual work holders 16 (Fig. 5) which are provided for carrying work pieces past the cutter 9. To facilitate moving the work holders through the machine a stationary work support or guideway for supporting and guiding the work holders 16 is formed by a pair of spaced ways 17 (Figs. 1 and 3) on the auxiliary base 13 extending from the forward side of the machine to the rear beneath and past the cutter 9. Spaced angular guides 18 (Fig. 6) are formed in the bottom surface of each holder 16 to engage the ways 17. As shown in Figs. 3 and 6, each of the work holders 16 has a plurality of work clamping devices 19 positioned thereon so that a plurality of work pieces 20 may be secured on the top surface of each holder.

The loading of the work holders 16 is preferably done on a loading table 21 (Figs. 1, 2 and 3) located at the receiving end of the ways 17. An upstanding lateral guide 22 (Fig. 3) is provided positioned on the loading table 21 so that a work holder 16 may be readily positioned for rearward sliding movement by the operator onto the forward end of the ways 17.

For the purpose of moving the work holders 16 longitudinally of the ways 17 in one direction past the cutter 9, a worm 25 is rotatably mounted in the auxiliary base 13 on a shaft 26. Means is provided for rotating the worm 25 and in its preferred form this means is associated with the main driving means (not shown) of the milling machine and includes the feed box (not shown) of the machine so as to take advantage of the different feeding speeds afforded by the feed box of the standard machine.

In the present instance this result is attained by a direct geared connection between the feed screw 12 of the standard machine and the worm 25 mounted in the auxiliary base. To this end the feed screw 12 as mentioned hereinbefore, is disengaged from the table 10 and a gear 27 (Fig. 4) is mounted on the screw which through the medium of an idler gear 28 transmits its rotary motion to a gear 29 mounted on the auxiliary base 13 intermediate and slightly below the rear end of the ways 17. The gear 29 is mounted on a stub shaft 30 which also carries another gear 31 meshing with a gear 32 fixed on a shaft 33 positioned beneath one of the ways 17 and extending parallel to the ways toward the worm 25. The end of the shaft 33 is connected to the worm 25 by means of gears 35 and 36 (Fig. 3) on the shafts 33 and 26 respectively.

In order that the work holders 16 may be moved mechanically from the feeding-in end of the ways 17 into engagement with the worm 25 means is provided for latching the holders together. In the present instance this latching means comprises a hook 37 (Fig. 3) mounted on a vertical pivot pin 38 adjacent the forward left hand corner of each of the holders 16 so as to project beyond the forward edge thereof for engagement with a recess 39 formed near the rear left hand edge of the preceding holder. A rearward extension 40 is provided on each of the hooks 37 and an expansive spring 41 is positioned between this extension and the side of the work holder so that the hook 37 will be pressed normally into the recess 39. A cam surface 43 is provided on the forward end of the hook 37 arranged to engage a corner of the preceding holder 16 when the rear holder is moved toward the preceding one so as to swing the hook 37 outwardly until it registers with the recess 39 to latch the holders together.

For the purpose of engaging the worm 25 an arcuate threaded portion or half-nut 45 (Fig. 6) is formed on the lower portion of each holder 16 and in order to insure engagement of this threaded portion 45 with the worm 25, a pair of laterally projecting flanges 46 are formed on the opposite sides of each holder 16 and are arranged to pass beneath a pair of inwardly projecting guide members 47 (Figs. 1, 2 and 3) mounted on the auxiliary base 13 at opposite sides of the worm 25. Thus the motion of the worm 25 will be transmitted to the work holder 16 which lies immediately thereover and this motion will be transmitted to the following work holders 16 by means of the interlocked connection formed by the hooks 37.

This construction permits work holders to be separately loaded on the loading table 21 and readily attached to the rear end of the continually moving train of holders which moves in a rearward direction past the cutter 9, means being provided for automatically unlatching the holders after they have passed the cutter 9 and for moving the leading holder out of the path of those which follow.

In the present instance the unlatching means and the holder removing means are directly associated with each other and are embodied in a mechanism arranged to utilize the weight of the leading work holder 16 and the feeding motion thereof to initiate the movement of the said work holder out of the path of the following holders. The invention contemplates that this mechanism will impart a translatory movement to the leading work holder. As shown in Figs. 2, 3 and 4, this mechanism comprises a platform 50 mounted for swinging movement about a horizontal shaft 51 which shaft is supported on the sub-base 13 on the left side of and parallel to the ways 17 near the discharge end thereof.

As shown in Fig. 2, two lugs 52 extend downwardly from the bottom of the platform 50 and are rotatable and slidable longitudinally on the shaft 51. The upper surface of the platform 50 is arranged so as normally to form substantially a continuation of the ways 17 but is provided with a smooth upper surface to permit of sliding movement of a work holder 16 transversely of the platform. A lug 53 (Figs. 2 and 3) is provided on the base 13 arranged normally to support the right hand side of the platform 50 to maintain the platform in its horizontal position but since the platform is slidably supported on the shaft 51 it may be moved longitudinally of the shaft to the right in Fig. 2 until the edge of the platform 50 slides off of the edge of the lug 53 to permit downward pivotal movement of the platform. The platform is normally maintained in its position overlying the lug 53 by means of an expansive coil spring 54 positioned about the shaft 51 and acting between a collar 55 on the shaft and one of the lugs 52.

A stop 56 is provided on the rear edge of the platform 50 (Figs. 2 and 3) so that it will be engaged by the leading end of the leading work holder and as the holder is pushed forwardly by the following holders, the platform 51 is moved longitudinally until it slides off of the lug 53, whereupon the weight of the work holder 16 causes the platform 50 to pivot downwardly about the shaft 51 to allow the work holder to slide transversely therefrom out of the path of the following work holders. During the transverse movement of the leading holder, the latch engaging recess 39 of that holder is moved out of engagement with the hook 37 on the following holder so as to unlatch the two holders from each other.

To permit continued transverse movement of the holder 16 after it has been discharged from the platform, an inclined surface 60 (Figs. 2, 3 and 4) is provided upon which the holder 16 is discharged from the platform 50. The platform 50, then relieved of the weight of the holder, is pivoted upwardly to its normal position by means of a counter weight 61 supported on an arm 62 projecting from the platform.

During its swinging movement, the platform 50 is held in contact with the vertical end surface of the lug 53 by the spring 54 and when the platform has been returned to its normal or level position by the weight 61, the spring 54 serves to move the platform over the lug 53 so that it will be supported thereby in position to receive the succeeding work holder.

The means for returning the finished work holders to the loading table 21 at the front of the machine, which means includes the transfer or translating mechanism just described, includes preferably a second transfer mechanism arranged to direct the holders toward the front of the machine and a conveyor for receiving the holders therefrom and discharging them onto a slideway 63 leading to the loading table. As illustrated herein, this second transfer mechanism is of a character similar to the one previously described and comprises a swingable platform 65 which serves to arrest the movement imparted to the work holders by the first mechanism in a direction transversely of the ways 17 and by reason of the weight and transverse motion of the holder 16, to initiate movement of the holder forwardly of the machine toward the loading table 21.

The platform 65 is supported at its rear edge on a horizontal shaft 66 which is mounted in a frame 67 adjacent to the lower end of the inclined surface 60 and perpendicular to the ways 17. Lugs 68 on the platform 65 surround the shaft so that the platform is pivotally and slidably supported and an expansive spring 69 acting between one of the lugs 68 and a collar 70 on the shaft 66 serves to urge the platform 65 toward the end of the inclined surface 60 so that the forward end of the platform overlies and is supported by an upstanding member or lug 71 mounted on the frame 67. A stop 72 (Fig. 4) is positioned on the platform 65 so as to be engaged by the moving work holder after the work holder is completely on the platform so as to move the platform from its position overlying the lug 71. The weight of the work holder may then pivot the platform 65 downwardly to initiate movement of the work holder 16 off of the platform in a forwardly direction.

From the platform 65 the work holder 16 is discharged onto the hereinbefore mentioned conveyor which is operable to convey the work holder to the loading table 21, the platform 65 serving as a transfer device which changes the direction of movement of the work holders and imparts a translatory movement thereto. Preferably the conveying means is also arranged to move the work holders by a motion of translation so as to return them to the loading table 21 in an unreversed position so that by simply sliding the holders transversely on the loading table they are in proper position to be fed again toward the cutter. The conveyor also supports the work holders 16 and work pieces 20 in an inclined position during a part of their travel so as to facilitate the removal of chips therefrom.

In the form herein shown, a chain conveyor 73 (Fig. 3) is provided consisting of two endless chains 74 supported in parallel spaced relation by sprockets 75 mounted on the frame 67. Each chain 74 is made up of a plurality of links 76 pivoted together by bars 77 which extend across the space between the chains 74 so that corresponding points in the two chains are pivoted by opposite ends of the same bar 77. To support the upper run of the chains 74 intermediate the sprockets 75 a pair of angle bars 79 are secured to the frame 67, one underlying each of the chains 74 and each having a substantially horizontal portion near the platform 65 and an inclined portion extending upwardly to the loading table 21. As shown in Fig. 1, the conveyor discharges the work-holders onto the elevated right-hand portion of the table 21, whence they slide to the left into position against or adjacent to the stop flange 22. In the present embodiment the conveyor 73 is driven by the forward sprockets 75 which are mounted on a shaft 80 (Figs. 1 and 2) driven by a forward extension of the shaft 26 through the medium of bevel gears 81, 82 (Fig. 1).

A plurality of transverse notches 88 (Fig. 5) are formed in the lower surface of each work holder 16 to engage the rods 77 so that the work holders will be moved positively by the conveyor. The chips washed from the work holders fall through the conveyor. The lower run of chain is preferably utilized continuously to remove such chips from beneath the conveyor and discharge them from one end of the machine. To this end a pair of angular members 83 (Fig. 4) are secured to the angle bars 79 to support a plate 84 so that the lower run of the chains will lie directly thereon. Thus the chips falling through the upper run of the conveyor will be moved rearwardly of the machine by the lower run of the conveyor.

Any preferred means may be used to remove the chips from the work holders 16 during their return movement to the loading table 21. In the present instance I have shown a liquid spray nozzle 85 (Figs. 2 and 3) suspended above the lower portion of the conveyor 73 and supplied with liquid from a suitable pressure source (not shown). I have also shown an air nozzle 86 near the upper end of the conveyor, said air nozzle being connected by means of a pipe 87 to a pressure air source (not shown). After the chips have been removed from the work holders 16, the holders are deposited one by one on the loading table 21 and it will be noted that during the entire movement of the work holders through the machine they have not been reversed and that they may be again moved onto the guideway 17 by a very simple operation. After the work pieces have been replaced on the work holder, the work holder may be slid along the guide 22 toward the cutter or to the right as shown in Fig. 3 until the hook 37 engages the recess 39 in the preceding work holder 16 and latches the two together.

From the foregoing it will be apparent that the invention provides an improved continuous milling machine which will serve to reduce materially production costs due to the provision of automatic means for unlatching the work holders, for moving the leading work holder out of the path of those which follow, and for returning the tables to the loading table one by one in unreversed position for replacement of the work pieces.

It will also be apparent that the particular means herein shown for attaining the above results are simple and rugged in their construction and positive and efficient in their operation.

The pivoted table 50 and the inclined surface 20 may be regarded as constituting a slideway. The conveyor 73 serves to transfer work-holders from the lower end of said slideway to the upper end of the slideway 63.

I claim as my invention:

1. A machine tool, comprising, in combination, a frame, a cutter rotatably mounted on said frame, a guideway extending transversely of the cutter axis, a power driven worm rotatably mounted adjacent the guideway and beneath the cutter, a work holder movable on said guideway by said worm, a movable platform pivotally supported at one end of said guideway adapted to receive a work holder from said guideway, means operable normally to support the free end of said platform, and means operable by movement of a holder onto said platform by said worm to release the free end of said platform from said supporting means to permit downward pivotal movement of the platform to an inclined position so that the work holder will slide off of said platform.

2. In a machine tool, the combination of a cutter, a pair of ways extending transversely of the cutter axis, a work holder movable along said ways, a pivoted receiving platform at one end of said ways adapted to receive a work holder therefrom, and arranged to tilt to permit a work-holder to slide laterally off the platform in a direction perpendicular to the ways, and means normally retaining said platform in its receiving position.

3. In a machine tool, in combination, a cutter, a plurality of separate work holders a rectilinear guideway along which said work holders may be moved past the cutter, a table at one end of said guideway upon which said holders may be loaded and from which they may be fed onto said guideway, and automatic means arranged to receive the work holders from the other end of said guideway and to return said holders one by one in unreversed position to said loading table said means comprising a slideway at the discharge end of the guideway, a slideway for delivering work-holders to the table, and means for transferring work-holders from the lower end of the first-mentioned slideway to the upper end of the second-mentioned slideway.

4. In a machine tool, in combination, a cutter, a guideway extending past the cutter, a plurality of individual work holders movable on said guideway, power means engageable with the work holders along a portion of said guideway for moving the work holders therealong, means for latching the work holders together so that all of the holders on said guideway will be moved therealong by said power means, said latching means being disengageable by sidewise movement of the leading work-holder, and means for imparting such movement to the leading work holder after said leading work-holder has passed out of engagement with said power means.

5. In a machine tool, the combination of a cutter, a work support extending past the cutter, a plurality of individual work holders movable along said work support, means for latching the work holders together, and means arranged to utilize movement of the leading work table transversely of the support to cause an automatic unlatching of the leading work table.

6. In a machine tool, the combination of a cutter, a plurality of separate work holders, a rectilinear guideway along which said work holders may be moved past the cutter, a loading table at one end of the guideway from which the holders may be fed onto the guideway, and automatic means arranged to receive the work holders at the other end of said guideway and to return said holders one by one in unreversed position to said loading table, said automatic means including an upwardly inclined conveyor so as to facilitate the washing of the chips from the work holders.

7. In a machine tool, in combination, a cutter, a guideway extending past the cutter, a plurality of individual work holders movable on said guideway, power means to move the work holders in one direction along said guideway, a hinged normally horizontal platform adjacent the discharge end of said guideway arranged to receive a work table from the guideway and to pivot downwardly after receiving such a work table so as to discharge said table therefrom, and a conveyor arranged to receive the work holder from said platform and to return it to the front of the machine.

8. A machine tool having, in combination, a cutter, a guideway extending past the cutter, a plurality of separate work holders movable on said guideway, means engageable with the work holders along a portion of said guideway for moving the work holders therealong, means for latching the work holders together so that all of the holders on said guideway will be moved by said power means, and automatic means arranged to utilize the weight of the leading work holder to unlatch said work holder from the one which follows after the leading work holder has passed beyond the point of engagement with said power means.

9. A machine tool having, in combination, a cutter, a guideway extending past the cutter, a plurality of individual work holders movable on said guideway in one direction past the cutter, power means engageable with the work holders to move said holders along said guideway, means for latching said work holders together for movement along said guideway, and automatic means operable after a work holder has passed the cutter to unlatch said work holder and initiate its movement out of the path of the following work holder.

10. In a machine tool, the combination of a cutter, a plurality of work holders, a guideway along which said holders may be moved past the cutter, power means for moving said holders in one direction along said guideway, means for causing movement of the leading work holder out of the path of the following work holder, and means operated by the movement of the work holders by said power means to control the operation of the last mentioned means.

11. A machine tool having, in combination, a cutter, a guideway extending past the cutter, a plurality of work holders movable along said guideway, means for latching said work holders together during movement along said guideway, driving means operable to move said work holders along said guideway, and means operable in timed relation to said driving means to unlatch the leading work holder from the one which follows and to initiate movement of said leading work holder out of the path of the following work holder.

12. A machine tool having, in combination, a cutter, a stationary work support extending past the cutter, a plurality of interchangeable work holders movable along said stationary work support past the cutter, means for latching said work holders together for movement along said support, driving means operable to move said work holders along said support, and means operable in timed relation to said driving means to unlatch the leading work holder from the one which follows and to initiate movement of said leading work holder out of the path of the following work table, said means being arranged to utilize the weight of the work holder to initiate said last mentioned movement.

13. A machine tool combining a cutter, a plurality of separate work holders, a stationary work support along which said work holders may be moved past the cutter, a loading table at the forward end of said stationary work support upon which said holders may be loaded, and automatic means arranged to receive the work holders after they have passed said cutter and to return said holders one by one to said loading table, said automatic means being arranged to support said work holders in an inclined position whereby to facilitate the washing of chips from the work holders.

14. A machine tool organization providing a stationary work support, a plurality of separate tables movable from the forward end of said stationary work support to the rear end thereof, power driven conveyor means operable to move said work holders back to a point adjacent the forward end of said stationary work support, and means automatically operable to transfer said work holders one by one from the rear end of said stationary support to said conveyor means.

15. A machine tool having, in combination, a work holder, a stationary work support along which said work holder may be moved from the forward end of said machine to the rear end thereof, downwardly inclined conveying means arranged to receive said work holder from the rear end of said stationary work support to convey said work holder transversely of said work support, and an upwardly inclined conveying means arranged to receive said work holder from said downwardly inclined conveying means and to move said work holder to the forward end of said machine adjacent the forward end of said stationary work support.

16. A transfer device for changing the direction of travel of a work holder or the like, said device comprising, in combination, a platform mounted for pivotal and sliding movement on a horizontal shaft adjacent one edge of said platform, an abutment adjacent the opposite edge of said platform over which said edge may be positioned so as to be supported thereby, resilient means arranged to urge said platform along said axis so that it will overlie said abutment, a stop on said platform arranged to be engaged by a work holder or the like as it is moved onto said platform so that said platform will be moved from its position overlying said abutment whereby to permit downward pivotal movement of said platform to a transversely inclined position wherein said work holder will slide from said platform, and counter-balancing means operable to pivot said platform upwardly to its normal position after the discharge of a work holder therefrom.

17. The combination with a machine tool having a plurality of work holders, of a conveying means for said work holders arranged to move said work holders in an inclined position whereby to facilitate the washing of chips from said work holders, said conveying means comprising an endless chain through which the chips may fall after being washed from the work holders, and a pan arranged to support the lower run of said chain and to catch the chips which drop through the upper run of said chain whereby said chips will be removed from the pan by the action of the lower run of said chain.

18. A machine tool having means providing a substantially rectangular path over which a work holder may be moved, said means including a stationary work support over which a work holder may be moved from the front to the rear of the machine, a conveyor extending transversely from the rear end of said stationary work support, a conveyor adapted to receive a work holder from said transverse conveyor and operable to carry such a work holder to the front of said machine, a loading table at the foward end of the stationary work support, and means to receive work-holders from the second mentioned conveyor and transfer them to the loading table.

19. A machine tool having, in combination, a rotatable cutter, a plurality of work holders, a stationary support providing a path along which said work holders may be moved in one direction past the cutter, and means for automatically returning the finished work holders, said means including a platform pivotally mounted adjacent the end of said support and operable by the weight of a work holder positioned thereon to pivot downwardly to initiate sliding movement of said work holder transversely of said support, and a second platform pivotally mounted and arranged to receive a work holder discharged from said first platform, said second platform being arranged to be pivoted downwardly by the weight of a work holder thereon to initiate movement of said work holder in a direction opposite to that in which it travelled while on said stationary support.

20. In a machine tool, a pair of work-holders, means to guide the holders for movement in tandem, the leading holder having a notch in one of its lateral edges, and a hook pivoted on a vertical axis on the other holder and adapted to enter said notch, the leading holder being disengageable from said hook by lateral movement of the leading holder with relation to the other holder after the leading holder has passed out of the control of said guiding means.

In testimony whereof, I have hereunto affixed my signature.

EDWARD H. SIMONSEN.